US006826279B1

(12) United States Patent
Alavi et al.

(10) Patent No.: US 6,826,279 B1
(45) Date of Patent: Nov. 30, 2004

(54) BASE BAND ECHO CANCELLATION USING LAGUERRE ECHO ESTIMATION

(75) Inventors: Hadi Alavi, Schaumburg, IL (US); Garibaldi Kung, Barrington, IL (US)

(73) Assignee: 3Com Corporation, Marborough, MA (US)

(*) Notice: Subject to any disclaimer, the term of this patent is extended or adjusted under 35 U.S.C. 154(b) by 0 days.

(21) Appl. No.: 09/578,545

(22) Filed: May 25, 2000

(51) Int. Cl.[7] .............................................. H04M 9/08
(52) U.S. Cl. ...................... 379/406.08; 379/406.01; 379/406.02; 379/406.03; 379/406.05; 379/406.06; 379/406.09; 379/406.11; 379/406.14
(58) Field of Search ...................... 379/406.01–406.16

(56) References Cited

U.S. PATENT DOCUMENTS

| | | | | |
|---|---|---|---|---|
| 3,647,992 A | * | 3/1972 | Thomas .................. | 379/406.08 |
| 4,322,811 A | * | 3/1982 | Voorman ................ | 379/406.08 |
| 4,333,158 A | | 6/1982 | Voorman | |
| 4,811,261 A | | 3/1989 | Kobayashi et al. | |
| 5,031,194 A | * | 7/1991 | Crespo et al. ......... | 379/406.08 |
| 5,163,044 A | | 11/1992 | Golden | |
| 5,166,924 A | * | 11/1992 | Moose .................... | 379/406.08 |
| 5,313,498 A | | 5/1994 | Sano | |
| 5,343,522 A | | 8/1994 | Yatrou et al. | |
| 5,486,833 A | | 1/1996 | Barrett | |
| 5,521,908 A | | 5/1996 | Younce et al. | |
| 5,568,202 A | * | 10/1996 | Koo ........................ | 379/406.08 |
| 5,649,012 A | | 7/1997 | Gupta et al. | |
| 5,909,384 A | * | 6/1999 | Tal et al. ................ | 379/406.08 |
| 5,930,749 A | | 7/1999 | Maes | |
| 5,933,494 A | | 8/1999 | Yang et al. | |
| 5,937,009 A | | 8/1999 | Wong et al. | |
| 5,953,412 A | | 9/1999 | Sheets et al. | |
| 6,009,083 A | | 12/1999 | Flanagan et al. | |
| 6,209,013 B1 | * | 3/2001 | Gonikberg et al. .......... | 708/319 |
| 6,256,383 B1 | * | 7/2001 | Chen ...................... | 379/406.08 |
| 6,269,115 B1 | * | 7/2001 | Mandyam .............. | 379/406.08 |
| 6,295,314 B1 | * | 9/2001 | Cole ....................... | 379/406.08 |
| 6,563,858 B1 | * | 5/2003 | Fakatselis et al. ..... | 379/406.08 |

OTHER PUBLICATIONS

J. Mourjopoulos et al., (1991), "Pole and Zero Modeling of Room Transfer Functions," *J. Sound and Vibration*, 146(2), p. 281–302.

(List continued on next page.)

*Primary Examiner*—Forester W. Isen
*Assistant Examiner*—Ramnandan Singh
(74) *Attorney, Agent, or Firm*—McDonnell Boehnen Hulbert & Berghoff LLP (57) ABSTRACT

A base band echo cancellation method and apparatus utilizing Laguerre echo estimation. The method begins with a series of transmitted symbols that are stored in a buffer. The buffer is segmented into a head portion and a tail portion. The symbols in the tail portion are passed through a Laguerre or IIR filter and then reinserted into the tail portion of the buffer. An echo estimation signal is generated based on the symbols in the buffer. The apparatus includes a transmit symbol buffer that is coupled through a modulator to a Laguerre or IIR filter. A demodulator couples the filter back to the buffer. An echo estimator is also coupled to the buffer.

19 Claims, 7 Drawing Sheets

OTHER PUBLICATIONS

G. Davidson et al., (1991), "Reduced Complexity Echo Cancellation Using Orthonormal Functions," *IEEE Transactions on Circuits and Systems*, 38(1), p. 20–28.

B. Ninnes et al., (1997), "A Unifying Construction of Orthonormal Bases for System Identification," *IEEE Transactions on Automatic Control*, 42(4), p 515–21.

P. Dreiseitel et al., (1998), "Acoustic Echo and Noise Control–A Long Lasting Challenge," <http://www.tudarmstadt.de/fb/et/signale/puder/paper/veroeffeusipco_98_tu-t.html>, *Proceedings EUSIPCO–98*, Isle of Rhodes, Greece, Sep. 1998.

L. Ngia et al, (1999), "Using Laguerre Filter for Adaptive Acoustic Echo Cancellation," Report 010/1999 (similar version appeared in 1999 *Int. Workshop on Acoustic Echo and Noise Control*, Sep. 1999).

L. Ngia, "An Overview of the Fundamental Problems and Solutions to Echo Cancellation," *Report CTH–TE–62*, Dept. of Applied Electronics, Chalmers University of Technology, Göteborg, Sweden, Sep. 1997.

L. Ngia et al., "Using Kautz Filter for Adaptive Acoustic Echo Cancellation," Report 012/1999 (similar version appeared in *Asilomar Conf on Signals, systems and Computers*, Oct. 1999).

* cited by examiner

FIG. 6
PRIOR ART

BASE BAND ECHO CANCELLATION USING LAGUERRE ECHO ESTIMATION

COPYRIGHT NOTICE

A portion of the disclosure of this patent document contains material that is subject to copyright protection. The copyright owner has no objection to the facsimile reproduction by anyone of the patent document or the patent disclosure, as it appears in the records of the United States Patent and Trademark Office, but otherwise reserves all copyright rights whatsoever.

FIELD OF THE INVENTION

The present invention relates to a GSTN (General Switched Telephone Network) modem. Specifically, the invention relates to methods and systems using an adaptive digital filter for echo cancellation.

BACKGROUND OF THE INVENTION

Echo Cancellation is a technique typically used for improving full duplex communications on a two-wire subscriber loop. In this context, an echo canceler is typically an adaptive filter for estimating an impulse response of an echo channel. The echo estimate is then subtracted from the received signal in order to remove the echo signal component.

Typically, a two-wire, full-duplex subscriber loop connects a subscriber to the GSTN via a central office. Hybrids are used at the subscriber end of the loop and at the central office to convert the two-wire subscriber loop to a four-wire full-duplex circuit. At the subscriber end of the loop, conventional telephones and modems employ hybrids to convert the two-wire subscriber loop to a four-wire full duplex circuit. The two-wire subscriber loop then may be used for the transmission of data to and from a modem.

For high speed applications, modems are required to tolerate a vast number of diverse channel and echo impairments associated with the communication channel. A typical echo canceler reduces the echo signal by employing an adaptive digital transversal filter to model the impulse response of the unknown echo channel. A transversal filter, which is also known as a tapped delay line filter, is a type of finite impulse response (FIR) filter. Most common echo cancelers use a transversal filter because the optimal coefficient values for convergence of the filter are well known. Echo cancellation using a FIR filter is achieved by updating the echo impulse response coefficients used in the transversal filter to track the characteristics of the unknown echo channel. However, a significant disadvantage is that as the echo path delay increases, the number of taps required of the transversal filter increases proportionally.

Conventional full duplex modems are typically implemented using dedicated DSP (Digital Signal Processing) hardware. Most DSP-based modems utilize one or more finite impulse response (FIR) adaptive filters to perform echo cancellation. Each filter is required to have a particular number of taps or delay units based on the maximum echo path delay. Generally, the larger the number of taps, the better the filter performs its filtering function. However, an associated disadvantage of such a long delay FIR filter is increased processing time. To meet the required level of echo cancellation, the transversal filter impulse response must span over all symbol intervals, which causes increased convergence time. In addition, there is an increased cost associated with the increased computational complexity of implementing a transversal filter having a large number of taps.

As an alternative to the FIR filter approach, one might consider implementing the echo canceler as an infinite impulse response (IIR) filter. The primary advantage of an IIR filter is that a long delayed echo can be estimated using a relatively small number of filter taps. A disadvantage of using an IIR filter, however, is that by their very nature these filters are potentially unstable.

An article entitled, "Reduced Complexity Echo Cancellation Using Orthonormal Functions," IEEE Transactions on Circuits and Systems, Vol. 38, January 1991, Gordon W. Davidson and David D. Folconer, the contents of which are incorporated herein by reference, demonstrates a two-stage echo cancellation process. A disadvantage of using the echo canceler proposed by Davidson/Falconer is that the two-stage process requires the received signal to be modified twice before echo cancellation is complete.

It would therefore be desirable to have an improved echo cancellation method and apparatus.

SUMMARY OF THE INVENTION

An object of the invention is to improve the performance of an echo canceler. An apparatus and method is described for canceling transmitted echo signals from a receive signal by generating an improved echo estimation. By using a Laguerre filtering technique in association with a FIR (transversal) filter, the size of the FIR filler is reduced while providing the performance of a larger more complex FIR filter.

In accordance with a first aspect of the invention, a method is provided for canceling echo from a received signal. The method begins by storing a series of transmitted symbols in a buffer. The buffer may be partitioned into a head portion and a tail portion, where the head portion relates to the head of the echo impulse response and the tail portion relates to the tail of the echo impulse response. A Laguerre filter is applied to symbols in the tail portion of the buffer. The symbols in the tail portion are replaced with the filtered symbols. Next, the method includes generating an echo estimation signal based on the symbols in the buffer.

In accordance with a second aspect of the invention, an improved echo canceler is provided. The echo canceler includes a transmit symbol buffer. A modulator is coupled to the transmit symbol buffer. A Laguerre filter is coupled to the modulator. A demodulator is coupled between the Laguerre filter and the buffer. An echo estimator is coupled to the buffer.

BRIEF DESCRIPTION OF THE DRAWINGS

The preferred embodiments of the present invention are illustrated by way of example, and not limitation, in the Figures of the accompanying drawings in which.

APPENDIX

Appendix 1 includes a pseudocode software listing for a preferred embodiment of the echo canceler.

Appendix 2 includes a pseudocode software listing for phase 0 of a preferred embodiment of the echo canceler.

Appendix 3 includes a pseudocode software listing for phase 1 of a preferred embodiment of the echo canceler.

Appendix 4 includes a pseudocode software listing for phase 2 of a preferred embodiment of the echo canceler.

DETAILED DESCRIPTION OF THE PRESENTLY PREFERRED EMBODIMENTS

Figure 1:
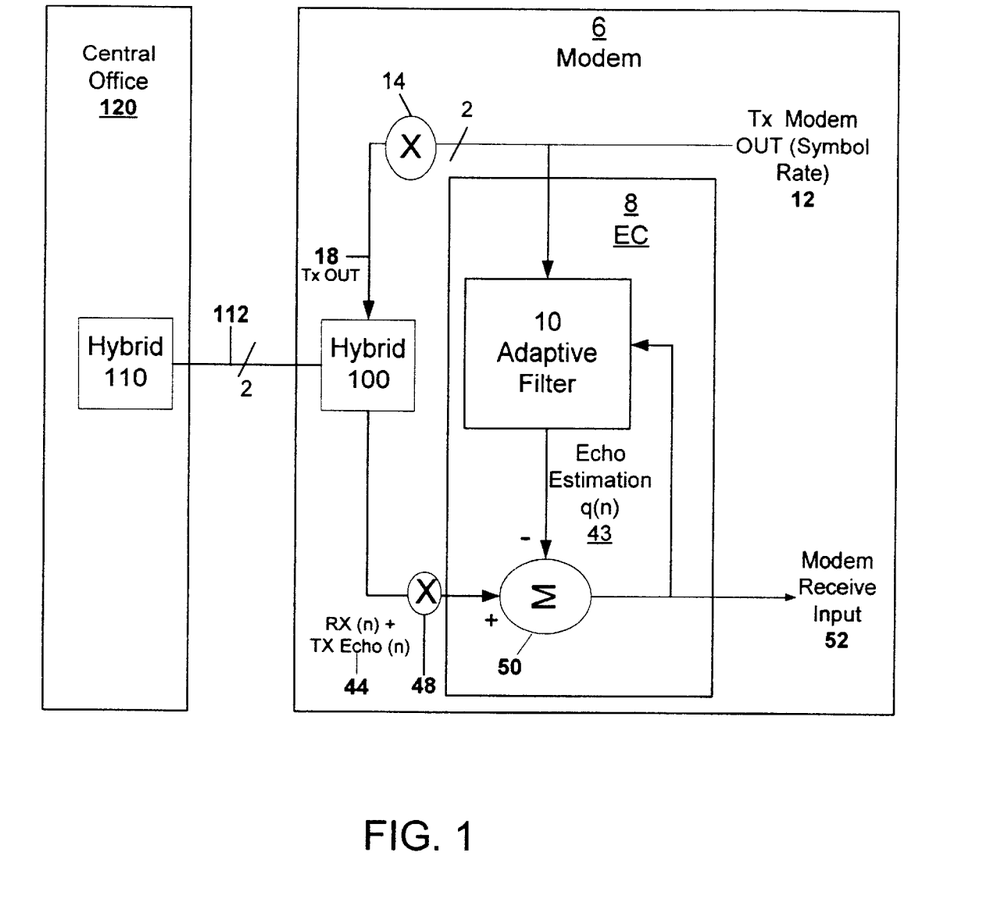
FIG. 1 illustrates the network level block diagram of a modem connected to a central office via a two-wire subscriber loop.

FIG. 1 illustrates the network level block diagram of a modem 6 connected to a central office 120 via a two-wire subscriber loop 112. A modem hybrid 100 at the subscriber end and a network hybrid 110 at the central office 120 are used to convert the two-wire subscriber loop 112 to a four-wire full duplex circuit.

The modem hybrid 100 is a three port device. A first port is coupled to the subscriber loop 112. A second port is coupled to a transmit output line 18 (also referred to as "Tx OUT"), which carries modulated symbols for transmission from the modem 6 over the subscriber loop 112. A third port of the modem hybrid 100 is coupled to a receive input line 44, which carries incoming signals from the subscriber loop 112.

The modem 6 also includes an echo canceler 8, which is connected in parallel with the hybrid 100 between the input line 44 and the transmit output line 18. The echo canceler 8 includes an adaptive filter 10 and a summer 50. The adaptive filter 10 generates an echo estimation signal 43, which is then subtracted by the summer 50 from signals on the receive input line 44. The incoming signals on the receive input line 44 therefore include both the intended receive signal, Rx (n), and an echo component, Tx Echo (n), resulting from the transmitted signal. Accordingly, the summer 50 has as inputs the receive+transmit echo signal on the receive input line 44 and the echo estimation signal, q(n), 43. The output of the summer 50 is the modem receive input signal 52.

Figure 2:
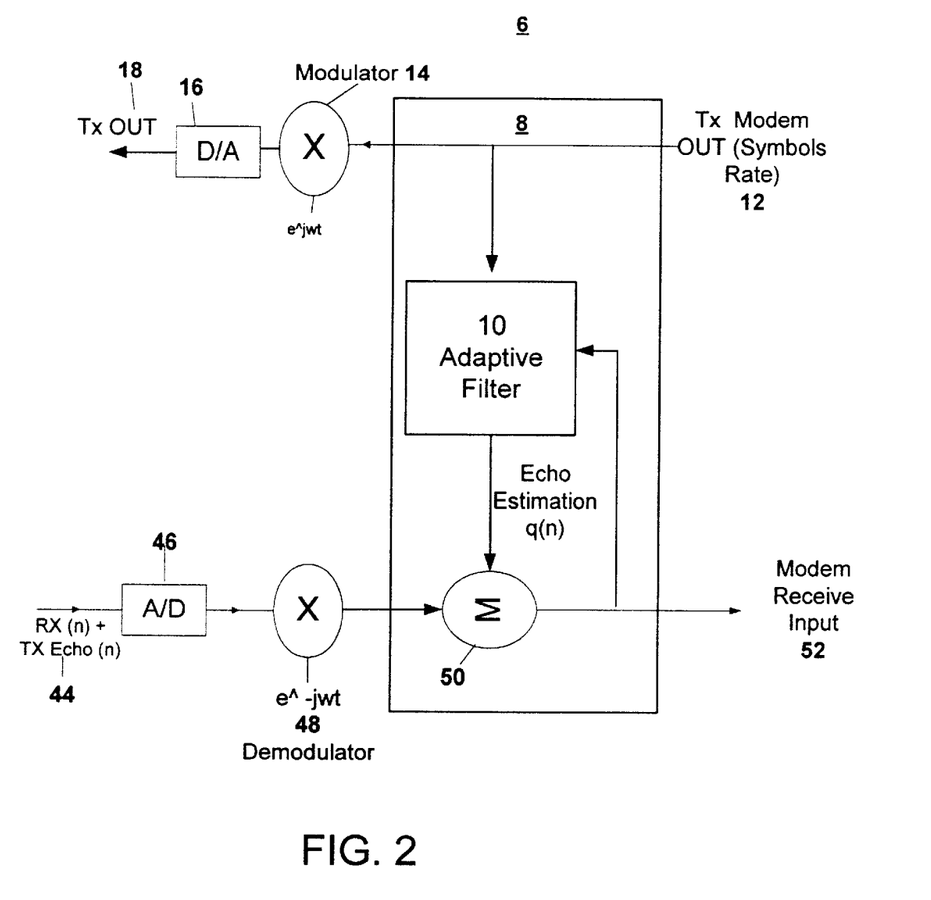
FIG. 2 is a block diagram illustrating the adaptive echo cancellation system.

The modem 6 of FIG. 1 is illustrated in greater detail in the block diagram of FIG. 2. The modem transmit signal 12 feeds a modulator 14 and an adaptive filter 10. Because the modem transmit signal 12 has yet to be modulated, it may be referred to herein as a base band signal. Likewise, because the echo canceler 8 receives a base band signal 12, the echo canceler 8 may be referred to herein as a base band echo canceler. Modulated signals such as the transmit output signal 18, on the other hand, may be referred to herein as pass band signals.

As illustrated in FIG. 2, the signal 44, which is coupled by the hybrid 100 from the subscriber loop 112, includes both the desired receive signal Rx(n) and an undesired echo, Tx Echo (n), of transmit output signal 18. The incoming signal 44 may therefore be referred to herein as the "receive+transmit echo" signal. As is understood by those skilled in the art, the echo is generally a delayed and attenuated variation of the transmit output signal 18.

The receive+transmit echo signal 44 feeds an analog-to-digital (A/D) converter 46, which operates to convert the analog signal 44 into a digital signal. The digital signal output of the A/D 46 feeds demodulator 48, which serves to down convert the incoming pass band signal to a base band signal. The outputs of the adaptive filter 10 and the demodulator 48, respectively, feed the summer 50 to produce the modem receive input signal 52. The general purpose of the echo canceler 8 is therefore to generate an echo estimation signal, q(n) to remove the undesired echo, Tx Echo (n), from the received signal 44. On the transmit side of the modem, a digital-to-analog (D/A) converter 16 converts the output of the modulator 14 to an analog signal. The analog signal is sent out through the hybrid 100 to the loop 112 as a transmit output signal 18.

Figure 3:
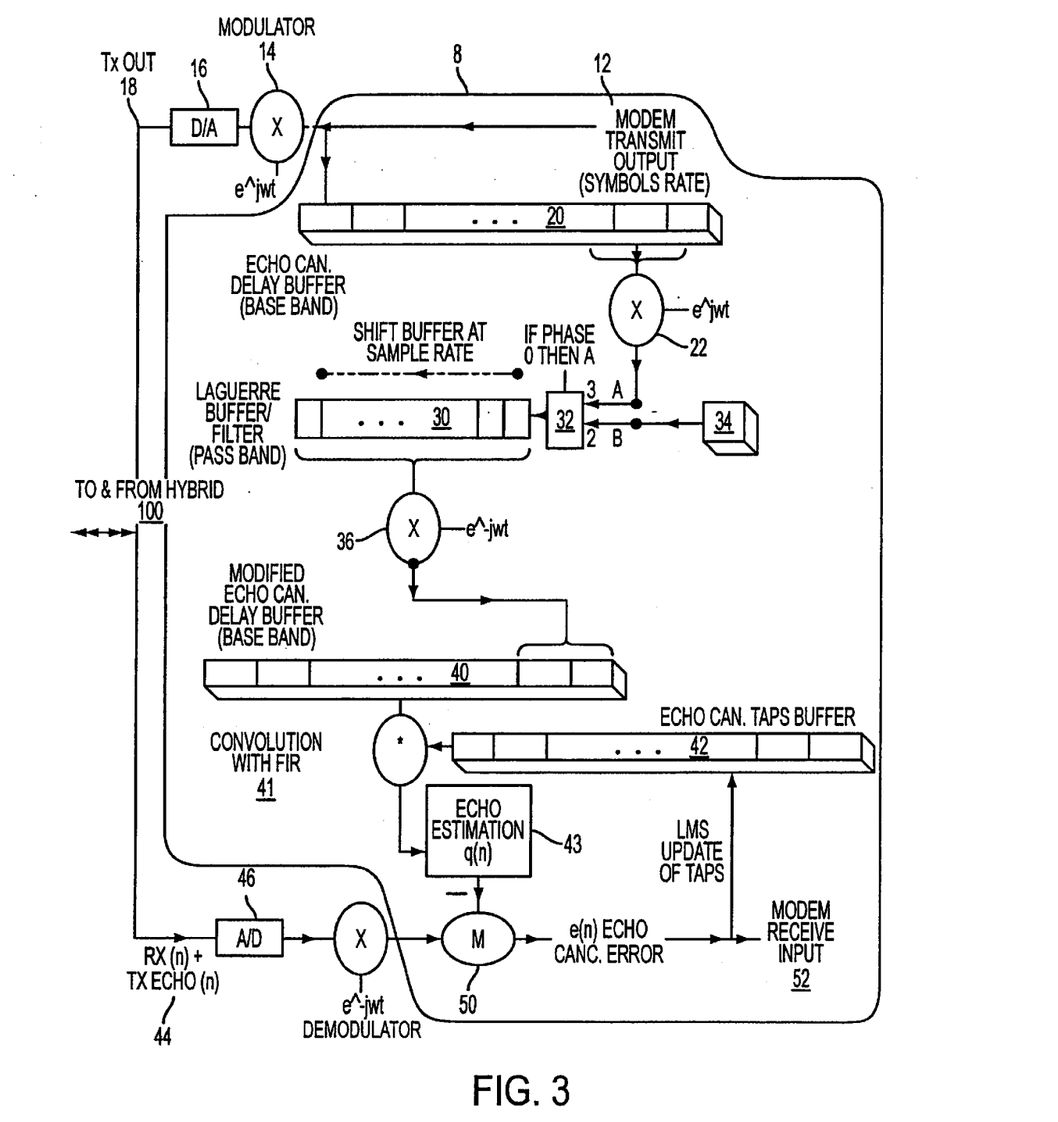
FIG. 3 is a block diagram illustrating the Laguerre filter in the adaptive echo cancellation system of FIG. 2.

The adaptive filter 10 of the echo canceler 8 is further illustrated in FIG. 3. The base band modem transmit signal 12 is coupled to a modulator 14 and an echo canceler delay buffer 20. The modulator 14 feeds the D/A converter 16 and then the modulated (pass band) signal is sent out as a transmit output 18 signal as previously described. The modem transmit signal 12 is also fed as a series of symbols at a predetermined rate into the echo canceler delay buffer 20. The echo canceler delay buffer 20 is preferably a FIFO buffer that holds a predetermined number of symbols that are referred to herein as the "tail symbols" and also holds a predetermined number of "head symbols." For example, if the echo canceler delay buffer 20 is M symbols long, and the last N of which, i.e. the oldest N symbols, are the tail symbols, then the buffer 20 includes M–N head symbols. In accordance with a preferred embodiment, M equals thirty-two and N equals twenty-two. Those skilled in the art will recognize that the length of the tail portion of the echo canceler delay buffer 20 may alternatively include either more or fewer than twenty-two symbols. In addition, the buffer 20 may alternatively include more or fewer than thirty-two slots.

The N tail symbols of echo canceler delay buffer 20 are coupled to a modulator 22 and then into input A of a multiplexer 32. The modulator 22 converts only the symbols in the tail portion of the buffer 20 into pass band form. It should be noted that the frequency of the modulator 22 preferably matches the frequency of the modulator 14.

A zero generator 34 feeds input B of the multiplexer 32. The multiplexer 32 determines the proper phase by selecting either the modulated tail symbol during phase 0, or a zero during each of phase 1 and phase 2. Shifting zeros in the multiplexer 32 during phases 1 and 2 is performed because, in accordance with a preferred embodiment, three-times oversampling of the actual symbol rate is utilized on the transmit side in order to facilitate better timing recovery on the receiver side. It is therefore only necessary to capture one of the three redundant symbols in order to construct an echo estimate. Any of the redundant symbols may be used, although the use of the first symbol, or phase 0 symbol, is described herein.

Generally, if n-times oversampling occurs on the transmit side, then n-1 zeros may be shifted into the shift buffer 30 by switching the multiplexer 32 from the modulated data stream to the zero generator 34. For example, if three times oversampling is used, then the modulated transmit symbol is passed through input A of multiplexer 32 during phase 0 and two zeroes are passed through input B of the multiplexer 32 during phase 1 and 2, respectively. Those skilled in the art will recognize that oversampling rates other than three-times oversampling may alternatively be used, or there may be no oversampling. If oversampling is not utilized for transmission, then this zero stuffing technique is not utilized.

Multiplexer 32 is coupled to a Laguerre filter/buffer 30, where a Laguerre filter is applied to each of the pass band symbols. The Laguerre filter/buffer 30 is connected to a demodulator 36, which is then connected to the modified echo cancellation buffer 40. Note that the modified echo cancellation buffer 40 is the same as echo canceler delay buffer 20, except that the symbols in the tail portion of the echo canceler delay buffer 20 are overwritten with the symbols that passed through the Laguerre filter. Therefore, a single echo canceler delay buffer is preferably used, although, two separate delay buffers may alternatively be implemented.

The resulting symbols in the modified echo cancellation buffer 40 are convolved 41 with coefficients from the echo canceler taps buffer 42. The convolution process is well known to those skilled in the art and represents the application of an FIR filter to the content of the buffer to produce an echo estimation signal, $q(n)$. Results from the convolver 41 feed the output echo estimation signal $q(n)$ 43 to the summer 50.

The receive+transmit echo signal 44 is coupled to the A/D converter 46 which then feeds the demodulator 48, as previously described in relation to FIG. 2. The echo estimation signal $q(n)$ 43, which may pass through a buffer, and the demodulator 48, feed separate inputs to the summer 50 to produce the modem receive input signal 52 by subtracting the echo estimate signal, $q(n)$, 43, from the output of the demodulator 48.

Figure 4:
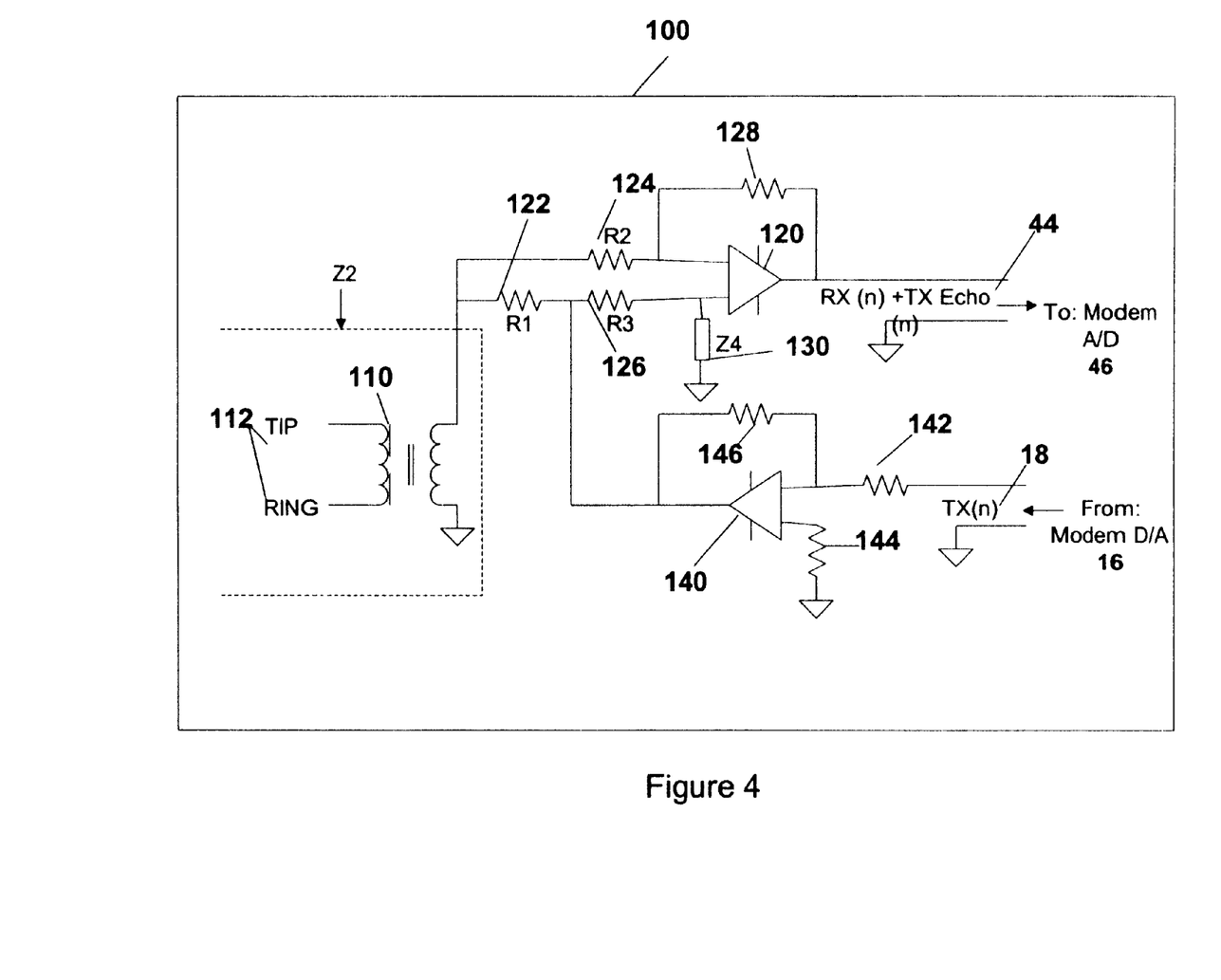
FIG. 4 is a block diagram illustrating an example of a hybrid.

An example of a modem hybrid, such as the modem hybrid 100 shown in FIG. 1, is illustrated in FIG. 4. FIG. 4 is a block diagram illustrating the echo source associated with a hybrid 100 in an exemplary analog transmission between a modem or other digital data source and a subscriber loop (for example). Transmit out data 18 from D/A 16 feeds transmit op amp 140 via input resistors 142 and 144, and feedback resistor 146 for transmission along the two-wire simplex ring and tip line 112. The output of op amp 140 feeds transformer 110 via combiner resistor 122. The transformer 110 interfaces the modem 6 (not shown) with the two-wire tip and ring subscriber loop 112. Transformer 110 also feeds receive op amp 120 through combiner resistor 122, input resistors 124, 126, input impedance 130, and feedback resistor 128. The output of op amp 120 provides the receive and transmit echo signal 44 for input to A/D 46. The source of the echo stems from the mismatch of the hybrid and appears as additive noise in the receive and transmit echo signal 44 at the output of the op amp 120.

Figure 5A:
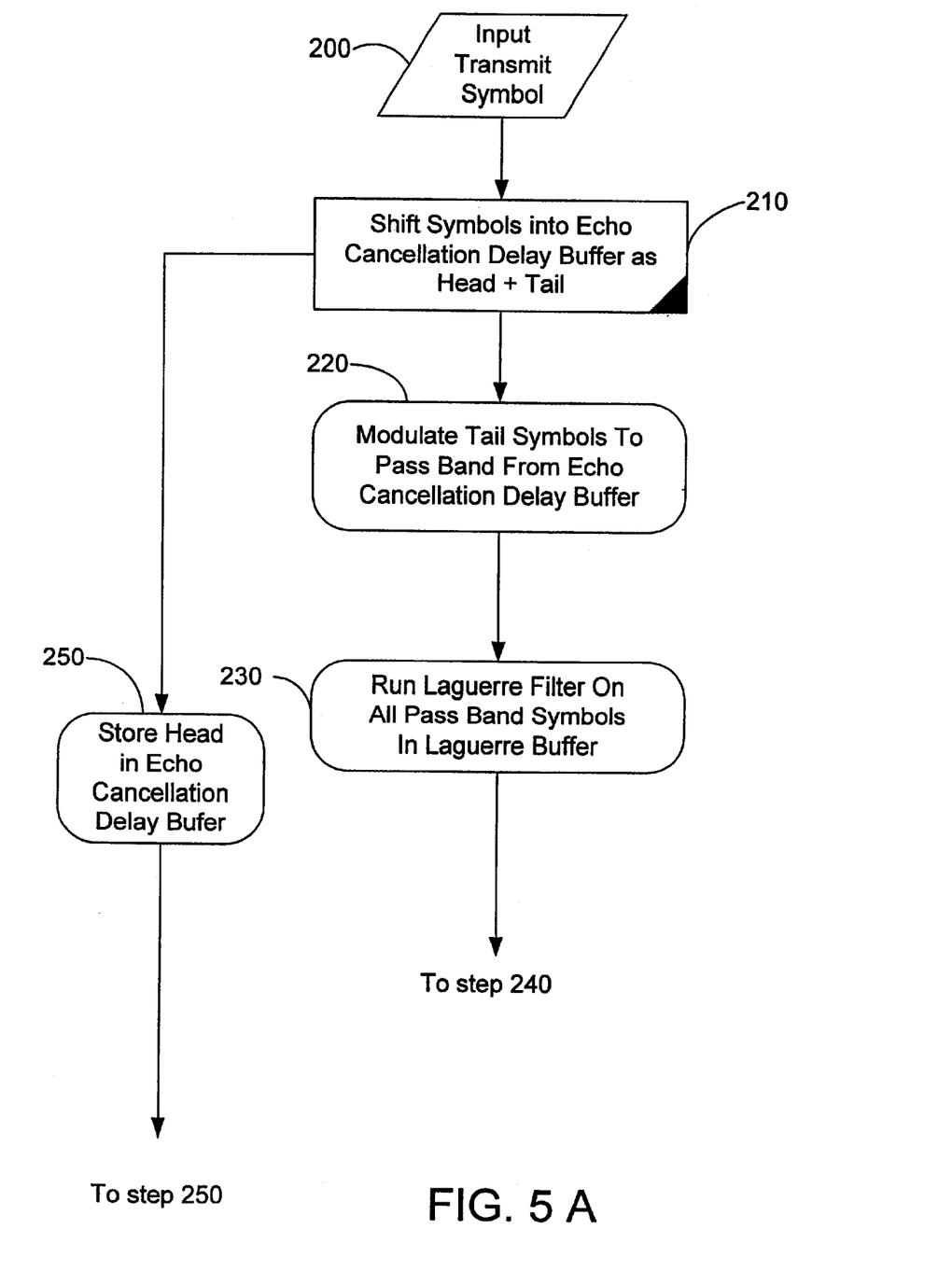
FIGS. 5A and 5B illustrate a method of using the Laguerre filter in the adaptive echo cancellation system.
Figure 5B:
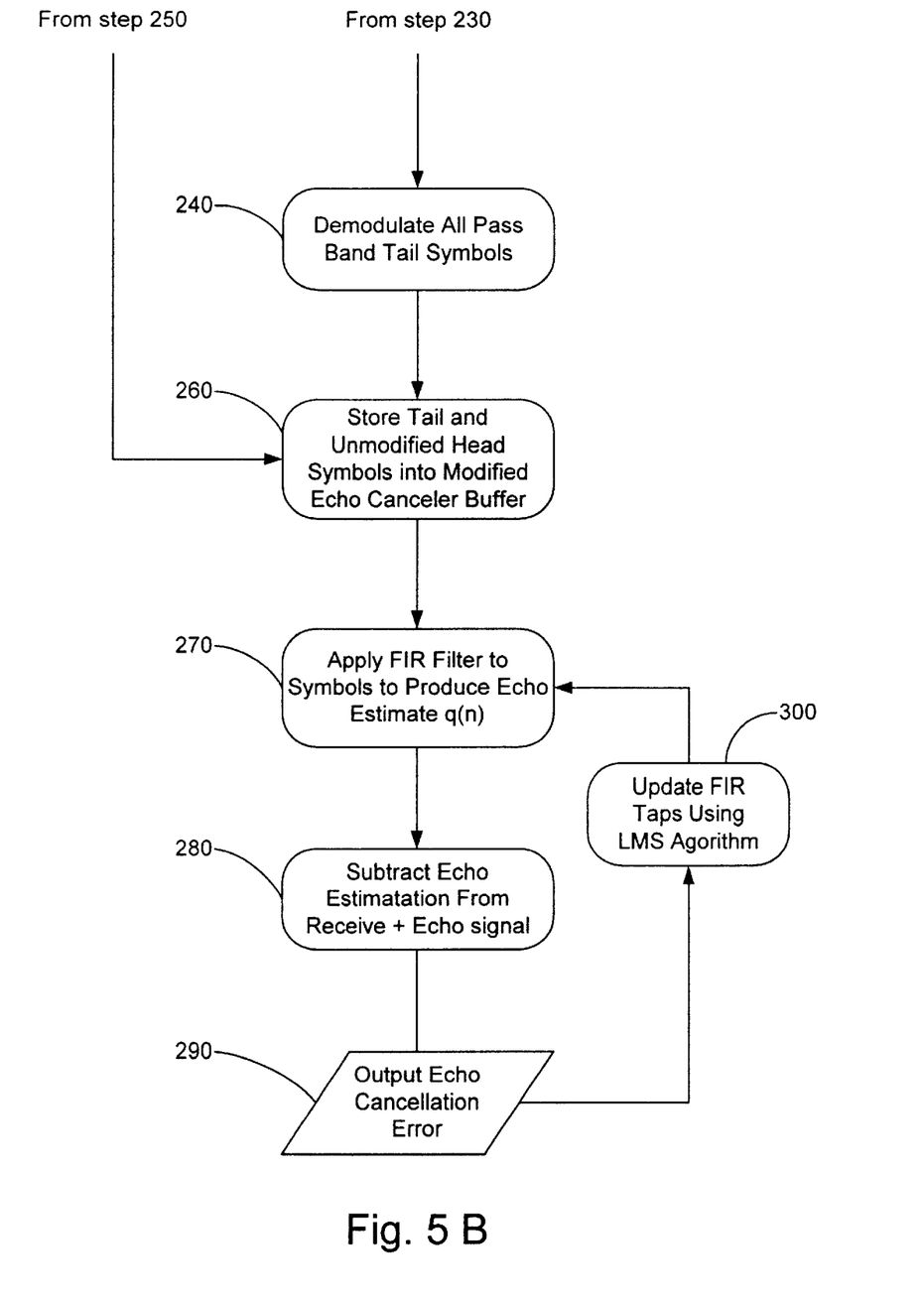

A method for echo cancellation in accordance with a preferred embodiment is shown in the flow chart of FIGS. 5A and 5B. A pseudocode listing is also provided in appendixes 1 through 4 hereto as an example of the software for the method illustrated in the flow chart of FIGS. 5A and 5B. The method begins with the input of a transmit symbol at step 200, such as from the modem transmit output 12. The stream of data, which is converted to a series of transmit output symbols 12, may be from a modem, computer, data buffer or any other source.

As the symbols are transmitted, each symbol is shifted into an echo cancellation delay buffer 20 at step 210. As described above, the echo cancellation delay buffer 20 includes a head portion, which contains the first or newest group of symbols, and a tail portion, which contains the last or oldest group of symbols in the echo cancellation delay buffer 20. Those skilled in the art may readily determine the required length of the buffer based on the transmit data rate and the anticipated round-trip time delay expected for echo signals. In one embodiment, the upstream modulation of the transmit output 18 is based on ITV-T Recommendation V.34 using QAM modulation. For example, based on the recommendation V.34 (QAM) data rates and expected delay times, the size of the echo cancellation delay buffer 20 may be 32 symbols in length. A symbol may represent a predetermined set of bits whose size may vary with the data rate as well as the symbol rate. For this example, the symbol rate is equal to 3,200 symbols per second.

As shown at step 220, the tail symbols (symbols in the tail portion of the echo canceler delay buffer 20) are modulated to a carrier frequency. The carrier frequency, for example may be based on the modulation requirement of V.34, V.90 or any other communication protocol or standard. The frequency of modulation preferably matches the frequency of the modulator 14, shown in FIG. 2, that operates on the transmit symbols before they are applied to the subscriber loop 112.

In accordance with a preferred echo cancellation method, the modulated tail symbols from step 220 are applied to a Laguerre filter at step 230. The Laguerre filtering of the modulated tail symbols is preferably performed as each new symbol is shifted into a buffer 30. After applying the Laguerre filter, the result is shifted into the buffer 30 and overwrites the previous symbol in buffer 30.

At step 240, the filtered tail symbols are demodulated to base band. After demodulating at step 240, the resulting updated tail symbols are reinserted as tail symbols of a modified echo canceler buffer at step 260. As noted above, the modified echo canceler buffer is preferably the same buffer as the echo canceler delay buffer 20, except that the tail symbols in the modified echo canceler buffer have been altered as described in the foregoing paragraphs. As shown at step 250, the "head" symbols from the echo canceler delay buffer are unaltered by pre-processing steps 220, 230, and 240 and remain stored in the buffer.

At step 270, a FIR filter is applied to the symbols in the buffer which includes both the unaltered head symbols and the filtered tail symbols. The echo canceler, typically implemented as an adaptive FIR filter, is used to model the impulse response of the unknown echo channel at step 270 so that the echo signal component of the received signal can be cancelled or at least substantially reduced. The result of the filtering operation at step 270 is an adaptively generated local replica of the transmit echo signal, referred to as an echo estimation signal, $q(n)$, based upon a model of the impulse response of the echo path.

Next, the echo estimate signal, $q(n)$, is subtracted from an incoming signal that includes both the desired receive signal and an echo signal, at step 280. A hybrid generates the unknown echo signal as shown, for example, in the receive+ echo signal 44 in FIG. 3. The unknown echo channel is not an actual functional block; rather it is a model of the echo phenomenon. The echo created by the hybrid (see hybrid 100 in FIGS. 1 and 4) and the echo channel do exist, yet the characteristic response of the echo channel and the values of the echo are not known a priori and must be estimated in order for echo cancellation to be effective. The unwanted echo signal becomes a part of the receive signal 44 which is transmitted to the receive modem A/D converter 46.

The local replica of the echo generated at step 270 is used by the summer 50 to attempt to cancel the echo before it enters the modem receive input 52. The unwanted echo is cancelled at step 280 by subtracting the echo estimate signal, $q(n)$, from the incoming signal, $Rx(n)+Tx$ echo $(n)$, to yield an echo residual signal, $e(n)$. The result of the summation operation at step 280 is the residual echo cancellation error, $e(n)$, shown at step 290.

The FIR filter in step 270 preferably utilizes a filter coefficient vector or taps buffer. At step 300 the filter coefficient vector or taps buffer is updated based on the error input signal, e(n). Those skilled in the art will readily recognize that the vector of echo impulse response coefficients 42 used in the echo canceler 8 is updated according to an algorithm or scheme that extracts information about the unknown echo channel from the echo cancellation error signal, e(n) 52. The coefficients of the coefficient vector taps are progressively updated at step 300 in order to track the characteristics of the unknown echo channel in order to maintain convergence.

In accordance with the preferred method presented with reference to FIGS. 5A and 5B, computational complexity is reduced in comparison to conventional echo cancellation techniques because a FIR filter with a large number of taps is unnecessary. Specifically, the Laguerre filter provides a more accurate estimate of the tail echo impulse response thereby reducing the number of filter taps required to model the echo channel.

Although the improved echo canceler described above is useful in client devices that are compliant with ITU-T Recommendation V.90 and Recommendation V.34, the contents of which are incorporated herein by reference, the improved echo canceler is readily applied to other full-duplex data communication standards and systems. Although the modulated carrier is converted under V.90 or V.34 to a transmit analog signal on the two-wire subscriber loop 112, the invention may be practiced on other types of networks other than two-wire subscriber loops. For example, near and far end echo may be compensated for simultaneously where full-duplex modulation standards require hybrids and other elements causing echo at various stages. Alternatively, the technique may apply to far-end echo at the central office. Furthermore, although described with reference to a modem, this invention may alternatively be used in any device having a hybrid or a termination causing an impedance mismatch, thus causing reflections. Those skilled in the art will be able, upon reading the foregoing, to apply the preferred embodiment adaptive echo cancellation technique to other applications, communication standards or protocols, where reflections may cause echoes.

Moreover, the base band echo cancellation apparatus and method described herein may alternatively be implemented as a pass band method and apparatus. Specifically, as described with reference to FIGS. 2 and 3 echo canceler 8 operates on base band symbols. The echo canceler may alternatively operate on pass band symbols if the echo canceler 8 is moved to the subscriber line 112 side of the modulator 14 and demodulator 48. For this alternative, the echo canceler may be simplified in that the modulator 22 and demodulator 36 are not required.

The method of altering the tail symbols using the IIR or Laguerre filter is best understood by examining the shape of a typical trans-hybrid echo impulse response. Initially, the echo impulse response increases rapidly, but then decreases and the tail of the response converges toward a constant level. By using the IIR or Laguerre filter on the tail symbols, an estimate of the tail of the impulse response may be generated using fewer symbols than would be required by a conventional transversal filter. Therefore, a FIR filter having a larger number of taps may be replaced with a smaller tap-FIR filter and a cascaded IIR filter. An improved echo estimate q(n) is achieved by applying the IIR or Laguerre filter to only the tail portion of the transmit symbol buffer. Although a preferred embodiment has been described with reference to a Laguerre filter, other appropriate IIR mathematical models for the tail response may alternatively be used.

Figure 6:
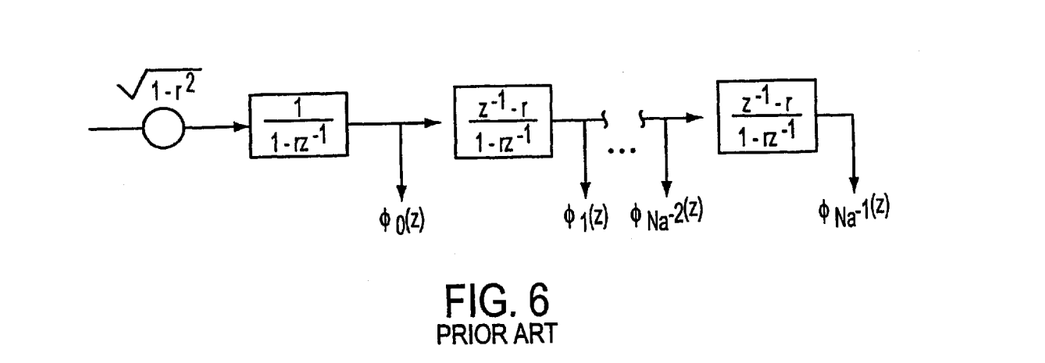
FIG. 6 illustrates a filter structure based on Laguerre functions.

The transfer function for the typical Laguerre filter is shown using the first order equation in Z-transform parameters as shown in FIG. 6. The Laguerre filter remains stable if the value of "r" in FIG. 6 is less than 1. In accordance with one preferred embodiment, the value of r may be selected as a nominal value of 0.95. Other values of r may be used, although the selected value must be less than 1. One skilled in the art will recognize r as the pole location of a first order equation. The value of r must be less than 1, or be inside the unit circle in order to prevent the filter from becoming unstable. This value should not be too small either, or too close to the origin, otherwise the IIR filter will not provide a sufficient expansion of the signal for estimation purposes. However, other values of r may be selected in order to prevent instability while permitting long time estimations of transmitted symbols. Also, the value of r may be different for each block represented in FIG. 6. For example, different values of r for each block in FIG. 6 may be obtained by modeling the echo cancellation performance by modeling the equation in FIG. 6 using conventional analysis tools such as Matlab.

All signals discussed are sampled symbols or signals of the form "a(n)". Although a signal is referred to as the "signal a(n)," it should be understood that "a(n)" can also represent the current sample value of the signal a(n) at an instant n, and that the signal a(n) under discussion may include, for example, a plurality of samples occurring prior to a(n), (i.e. a(n-1), a(n-4), etc.).

The echo canceler preferably includes an echo canceler delay buffer, a modulator, a pass band Laguerre filter, a demodulator and a FIR filter. The echo canceler delay buffer receives a series of transmitted symbols. The delayed symbols associated with the tail of the echo impulse response are then modulated. The modulated tail symbols are passed through a Laguerre filter. The symbols output from the Laguerre filter are then demodulated and reinserted into the tail portion of the delay buffer. The tail symbols and the unaltered head symbols and then applied to a FIR (finite impulse response) filter in order to produce an echo estimation. The echo estimation is then subtracted from the received signal in order to cancel the echo signal component of the received signal.

An advantage provided by the preferred embodiments is to realize the performance characteristics of a larger FIR filter capable of canceling echoes with long tails, but with the reduced complexity of a smaller FIR filter having fewer filter taps. Another advantage is that the preferred embodiments increase the SNR (signal-to-noise ratio) and decrease convergence time of the echo canceler. Yet another advantage is that the preferred embodiments increase echo canceler performance by performing an IIR filter subroutine on the tail symbols to represent the tail of the echo impulse response using fewer symbols prior to base band FIR filtering.

The entire method of performing echo cancellation as described above may be implemented in hardware, software or a combination of both. For example, all steps in FIG. 5 (i.e. the modulation/demodulation, filtering, and convolution of signals) may be performed by a DSP (digital signal processor) such as a TI C54, or a microprocessor capable of approximately 90 MIPS (millions of instructions per second) or more and having memory and the appropriate interface hardware such as buffers, latches and transceivers. In accordance with a preferred embodiment, all functions of the echo canceler are implemented in software that is run by a DSP or microprocessor.

Although described above with reference to a modem, the echo canceler and echo cancellation method claimed herein may alternatively be incorporated within or applied by other communication devices that utilize echo cancellation techniques. For example, a computer, a cellular telephone, an internet appliance, a personal digital assistant, or the like, that includes a microprocessor or digital signal processor (DSP) for performing communication functions, typically performed by a modem, may utilize the echo canceler and/or echo cancellation method of the present invention.

---

Appendix 1

Appendix 1 includes a pseudocode software listing for a preferred embodiment of the echo canceler.

```
//Coding Style: Psuedo Code
#define  Laguerre_Length      len
#define  N                                      Echo_Canceller_Length
#define  Start_of_Echo_Tail      x
// Last N-x Symbols in the Echo Canc. Buffer
main(){
    while(transmitting){
      for(n=0;len;++){
          Laguerre_Buf[len-n+1] = Laguerre_Buf[len-n];   //Shift Real Symbols
              }
      for(n=0;len;++){
          Laguerre_Buf[len-n+1] = Laguerre_Buf[len-n];    //Shift Img. Symbols
              }
      if(sample=0){
          Laguerre_Buf[0] = EC_Buf[x] * e^jwt;         // Modulate Base band
                                                      symbol . . .
          Laguerre_Buf[1]= EC_Buf[x+1] * e^jwt;       // and put into Lag. Buffer
              }
      else{
        Laguerre_buf[0] = 0;
        Laguerre_buf[1]   = 0;
              }
      Laguerre_Function(Laguerre_Buf,len);           // Call Laguerre Function
      for(n=0;len;++){
      EC_Buf[x+n] = Laguerre_Buf[n] * e^-jwt;        // Demodulate and put back
                                                      into EC_Buf
      EC_Buf[x+n+1] = Laguerre_Buf[n+1] * e^-jwt;
              }
      Echo_Estimation = Convolve_FIR(EC_Buf,N);
              }
    }
```

---

Appendix 2

Appendix 2 includes a pseudocode software listing for phase 0 of the a preferred embodiment of the echo canceler.

Phase 0
|
|
|
V
Update Carrier VCO Frequency
|
|
|
V
Shifting symbols (Real and Imaginary) in the Laguerre Ripple Buffer.
Performing a "delay line" operation by running from the oldest value to the newest.
|
|
|
V
Take a base band symbol from the tail part of the echo canceller delay buffer and modulate it with carrier frequency
Pass band symbol = [an + jubn]u[cos(i) + jusin(i)]
             = [anucos(i) − bnusin(i)] + ju[anusin(i) + bnucos(i)]
|
|
|
V
Run Laguerre on all pass band symbols in its buffer.
|
|

Appendix 2

|
V
Demodulate all pass band symbols in the Laguerre buffer with the same carrier frequency as above.

base band symbol = $[a_n + ju b_n]\dot{u}[\cos(\dot{i}) - j\sin(\dot{i})]$
$= [a_n\dot{u}\cos(\dot{i}) + b_n\dot{u}\sin(\dot{i})] + ju[a_n\dot{u}\sin(\dot{i}) - b_n\dot{u}\cos(\dot{i})]$

|
|
V
Store all base band symbols from the Laguerre buffer to the tail part of the echo canceller delay buffer.

|
|
V
Convolve all symbols with the LMS FIR filter for Echo Path Estimation.

Appendix 3

Appendix 3 includes a pseudocode software listing for phase 1 of the a preferred embodiment of the echo canceler.

Phase 1
|
|
V
Update Carrier VCO Frequency
|
|
V
Shifting symbols (Real and Imaginary) in the Laguerre Ripple Buffer.
Performing a "delay line" operation by running from the oldest value to the newest.
|
|
V
Shifting in two zeros (1 Real, 1 Imaginary) to the top of the Laguerre Ripple Buffer.
|
|
V
Run Laguerre on all pass band symbols in its buffer.
|
|
V
Demodulate all pass band symbols in the Laguerre buffer with the same carrier frequency as above.

base band symbol = $[a_n + ju b_n]\dot{u}[\cos(\dot{i}) - j\sin(\dot{i})]$
$= [a_n\dot{u}\cos(\dot{i}) + b_n\dot{u}\sin(\dot{i})] + ju[a_n\dot{u}\sin(\dot{i}) - b_n\dot{u}\cos(\dot{i})]$

|
|
V
Store all base band symbols from the Laguerre buffer to the tail part of the echo canceller delay buffer.
|
|
V
Convolve all symbols with the LMS FIR filter for Echo Path Estimation.

Appendix 4

Appendix 4 includes a pseudocode software listing for phase 2 of the a preferred embodiment of the echo canceler.

-continued

Appendix 4

```
Phase 2
   |
   |
   V
Update Carrier VCO Frequency
   |
   |
   V
Shifting symbols (Real and Imaginary) in the Laguerre Ripple Buffer.
Performing a "delay line" operation by running from the oldest value to the newest.
   |
   |
   V
Shifting in two zeros (1 Real, 1 Imaginary) to the top of the Laguerre Ripple Buffer.
   |
   |
   V
Run Laguerre on all pass band symbols in its buffer.
   |
   |
   V
Demodulate all pass band symbols in the Laguerre buffer with the same carrier
frequency as above.
   base band symbol = [an + jubn]u[cos(i) − jusin(i)]
                    = [anucos(i) + bnusin(i)] + ju[anusin(i) − bnucos(i)]
   |
   |
   V
Store all base band symbols from the Laguerre buffer to the tail part of the echo
canceller delay buffer.
   |
   |
   V
Convolve all symbols with the LMS FIR filter for Echo Path Estimation.
```

We claim:

1. A method of canceling echo from a received signal, comprising the steps of:
storing a series of transmitted symbols in a buffer having a tail portion and a head portion;
applying a Laguerre filter to symbols in the tail portion of the buffer;
replacing the symbols in the tail portion of the buffer with the filtered symbols;
applying a filter to symbols in the head portion and the Laguerre-filtered symbols in the tail portion; and
generating an echo estimation signal based on the symbols in the buffer.

2. A method of canceling echo as claimed in claim 1, further comprising the steps of:
modulating the symbols in the tail portion of the buffer prior to the step of applying the Laguerre filter; and
demodulating the filtered symbols prior to the replacing step.

3. A method of canceling echo as claimed in claim 2, wherein the modulating step comprises modulating the transmit symbols to a carrier frequency.

4. A method of canceling echo as claimed in claim 1, wherein the step of applying a filter to symbols in the head portion and the Laguerre-filtered symbols in the tail portion comprises applying an FIR filter to the symbols in the head portion and the Laguerre-filtered symbols in the tail portion.

5. A method of canceling echo as claimed in claim 1, further comprising the step of subtracting the echo estimation signal from the received signal to produce an error signal.

6. A method of canceling echo as claimed in claim 1, further comprising the step of updating a set of FIR coefficients of the FIR filtering step based on the error signal.

7. A signal processor programmed with a set of instructions to perform the method of claim 1.

8. An echo canceling system for canceling echo from a received signal, comprising:
a transmit buffer for storing the received signal;
a modulator coupled to the transmit buffer;
a Laguerre filter coupled to the modulator for filtering a tail portion of the received
a demodulator coupled to the Laguerre filter;
a modified transmit buffer coupled to the demodulator; and
an echo estimator coupled to the modified transmit buffer, wherein the echo estimator generates an echo estimation signal, at least in part, by applying a filter to the Laguerre-filtered tail portion of the received signal and also to a head portion of the received signal.

9. The system as claimed in claim 8 wherein the echo estimator is a FIR filter.

10. The system as claimed in claim 9, further comprising a summer connected to the FIR filter for subtracting an echo estimate produced by the FIR filter from the received signal.

11. The system as claimed in claim 10, wherein the FIR filter further comprises:
   a convolver connected to the modified transmit buffer; and
   a FIR coefficient buffer connected between the summer and the convolver.

12. The system as claimed in claim 10, wherein the modified transmit buffer is a modified echo cancellation buffer.

13. An echo canceler running on a processor having memory and an output device comprising:
   a transmit buffer;
   a modulator connected to the transmit buffer;
   a tail filter connected to the modulator;
   a demodulator connected to the tail filter;
   a modified transmit buffer connected to the demodulator where the tail of the modified transmit buffer is populated with data from the demodulator;
   a filter convolver connected to the modified transmit buffer, wherein the filter convolver applies a filter to a head portion and a tail portion of the modified transmit buffer; and
   a summer connected to the filter convolver.

14. An echo canceler as claimed in claim 13 where the tail filter is a Laguerre filter.

15. An echo canceler as claimed in claim 14 where the filter convolver is an FIR filter convolver.

16. An echo canceler comprising:
   means for buffering a series of transmit symbols;
   means for modulating a tail portion of the series of transmit symbols;
   means for filtering the modulated tail portion symbols;
   means for demodulating the filtered tail portion symbols;
   means for convolving the filtered tail portion symbols and head portion symbols with a FIR filtering means; and
   means for summing the convolved symbols with the received signal.

17. An echo canceler as claimed in claim 16 where the means for filtering is a Laguerre filter.

18. A method of canceling echo from a received signal, comprising the steps of:
   storing a series of transmitted symbols in a buffer having a tail portion and a head portion;
   applying an IIR filter to symbols in the tail portion of the buffer;
   replacing the symbols in the tail portion of the buffer with the IIR-filtered symbols;
   applying a filter to symbols in the head portion and the IIR-filtered symbols in the tail portion; and
   generating an echo estimation signal based on the symbols in the buffer.

19. The method of claim 18, wherein applying a filter to symbols in the head portion and the IIR-filtered symbols in the tail portion comprises applying an FIR filter to symbols in the head portion and the IIR-filtered symbols in the tail portion.

* * * * *